United States Patent [19]
Takeuchi et al.

[11] Patent Number: 5,176,039
[45] Date of Patent: Jan. 5, 1993

[54] AUTOMATIC TRANSMISSION WITH FEEDBACK PASSAGE FOR PREVENTING REVERSE FLOW

[75] Inventors: Osamu Takeuchi, Nishio; Yoshikazu Sakaguchi, Anjo; Takahiro Yamashita, Nishio; Akira Hoshino, Okazaki; Yutaka Taga, Aichi; Yasuo Hojo, Nagoya; Yoshiharu Harada, Toyota, all of Japan

[73] Assignees: Aisin AW Co., Ltd.; Toyota Jidosha Kabushiki Kaisha, both of Japan

[21] Appl. No.: 786,814

[22] Filed: Nov. 5, 1991

[30] Foreign Application Priority Data

Nov. 5, 1990 [JP] Japan ................................. 2-299216

[51] Int. Cl.⁵ ............................................. F16H 57/04
[52] U.S. Cl. ......................................... 74/467; 74/606 R
[58] Field of Search .............................. 74/606 R, 467

[56] References Cited

U.S. PATENT DOCUMENTS

| | | | |
|---|---|---|---|
| 4,495,830 | 1/1985 | Yasue et al. | 74/467 |
| 4,903,798 | 2/1990 | Takemoto et al. | 74/467 X |
| 4,922,765 | 5/1990 | Hayakawa et al. | 74/15.88 |
| 4,995,971 | 2/1991 | Droste et al. | 74/467 X |
| 5,050,447 | 9/1991 | Hayakawa et al. | 74/467 X |

FOREIGN PATENT DOCUMENTS

59-205065  11/1984  Japan .

Primary Examiner—Dirk Wright
Attorney, Agent, or Firm—Lorusso & Loud

[57] ABSTRACT

An automatic transmission with a reverse inhibit feedback passage between front and rear oil sumps. The transmission includes a case, a passage in the case for returning oil to the front sump from the rear sump and a flap valve for allowing the flow from rear sump to front sump while inhibiting oil flow in the reverse direction.

8 Claims, 8 Drawing Sheets

AUTOMATIC TRANSMISSION WITH FEEDBACK PASSAGE FOR PREVENTING REVERSE FLOW

BACKGROUND OF THE INVENTION

1. Field of the Invention

The present invention relates to an automatic transmission, in particular, relates to the flow of oil between sumps in different sections of the transmission.

2. The Prior Art

An automatic transmission for a four-wheel drive vehicle, includes a transmission, a transfer mechanism for distributing an output torque to front and rear wheels, and a chain transmitting mechanism.

When an automatic transmission such as the one described above, is installed in the usual off-road vehicle, the automatic transmission includes a transfer mechanism with a chain transmitting mechanism provided in a case independent of the transmission oil circuit and is supplied oil from an individual oil pump, because there was space for installation.

Recently, it has become necessary to make a transmission structure in more compact size and lighter weight for installing in a vehicle in a restricted space. In the case of the independent transfer mechanism, the temperature of the oil is increased by stirring it in the chain housing whereby the oil is degraded, the viscosity of the oil is decreased, and the cooling efficiency of the oil is decreased. As the result of this the efficiency of the rotating elements such as friction members or chain links is decreased, causing failure. Under the above circumstance, it is preferred that the transfer mechanism and the transmission have unitary construction with the chain transmitting mechanism oil circuit.

However, the oil in the transmission is forced to one end by inertia, the decrease of fluidity, and the inclination during fast starting, low temperature and acceleration when the transfer mechanism is integrated into the transmission. Under these circumstances, since the oil level in the oil pan disposed in the lower portion of the transmission is inclined to the front end or is low, the oil level can become lower than the suction port, in which case the oil supply to the oil pump is ceased by suctioning air and the oil fluid cannot be supplied to each member of the automatic transmission. Therefore, it becomes impossible to control the transmission and it may be impossible to start the vehicle. In order to prevent the above phenomenon, it is proposed that the oil pan be located lower to prevent the oil from flowing to the rear end during automatic rear inclination and to keep sufficient oil in the oil pan. However, it is very difficult to provide such a construction as above described for installation in a vehicle, except for an off-road vehicle.

SUMMARY OF THE INVENTION

Accordingly, it is an object of the present invention to provide an automatic transmission, in which the oil in a feedback passage is prevented from flowing backward to the rear end thereof during rapid acceleration and starting of the vehicle, keeping the oil at its proper level.

To comply with the above object, the automatic transmission of the present invention includes a feedback passage for feeding oil supplied to the rear back to the front end of the case, and a reverse inhibit means for preventing the oil from reversing, while allowing the oil to feed in the feedback direction in the passage.

In the automatic transmission having the above-described construction, when oil supplied to the rear end and returned to the front end in the passage of the case flows reversely to the rear end of the transmission by inertia force during rapid starting, rapid acceleration and so on, the reverse inhibit means closes the feedback passage by a self-working inertia force and prevents the oil from flowing reversely.

Furthermore, according to the present invention, since the oil in the feedback passage is prevented from flowing reversely to the rear end during rapid starting and rapid acceleration, the oil is prevented from accumulating in the rear end, to maintain the same oil level during urgent starting and urgent acceleration as during constant speed driving. These and other objects and advantages of the present invention will become clear from the following description with reference to the accompanying drawings, wherein:

An embodiment of the present invention will now be described with reference to the drawings.

Figure 3:
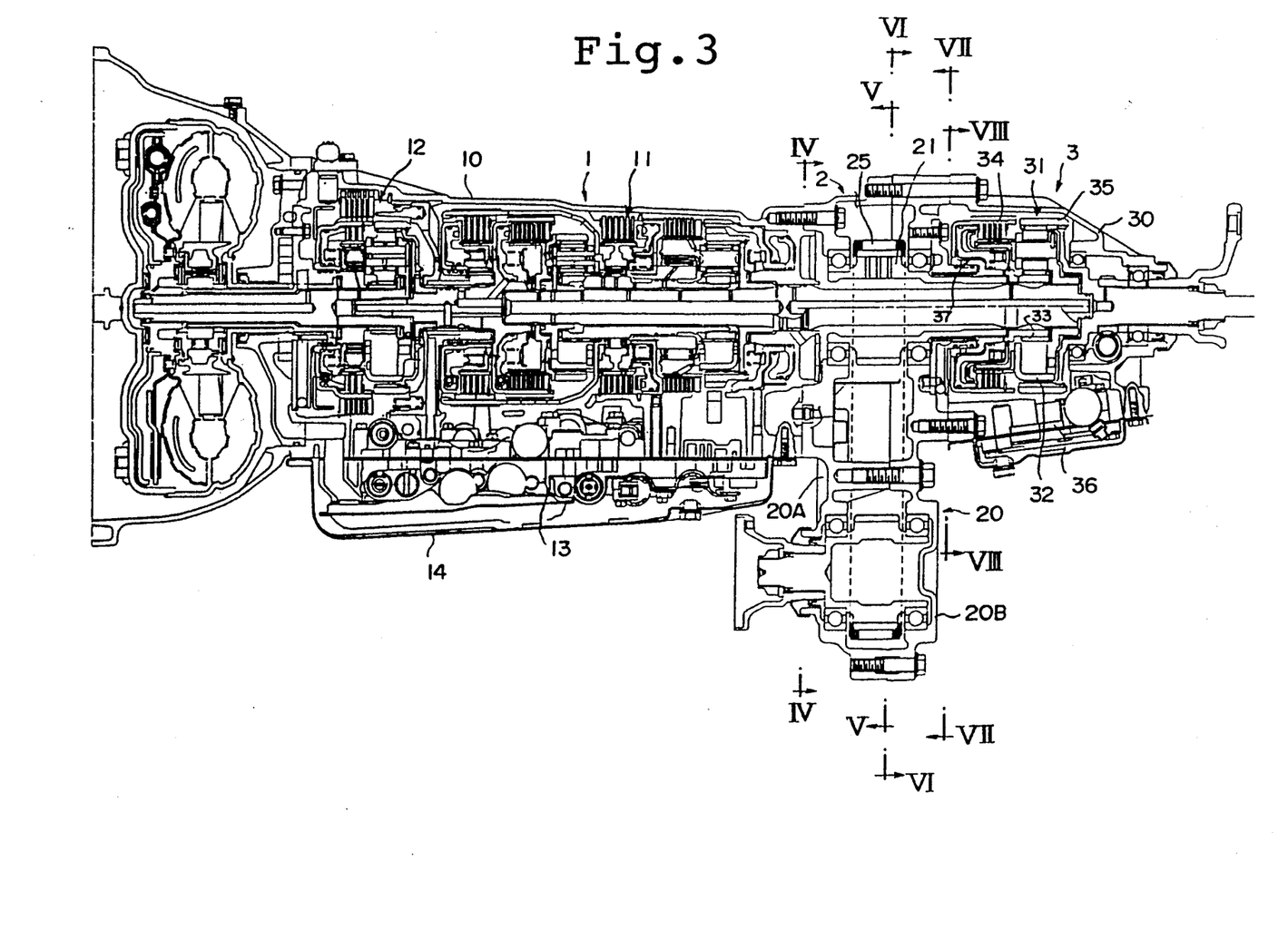
FIG. 3 is a cross-sectional view of the total automatic transmission.
Figure 4:
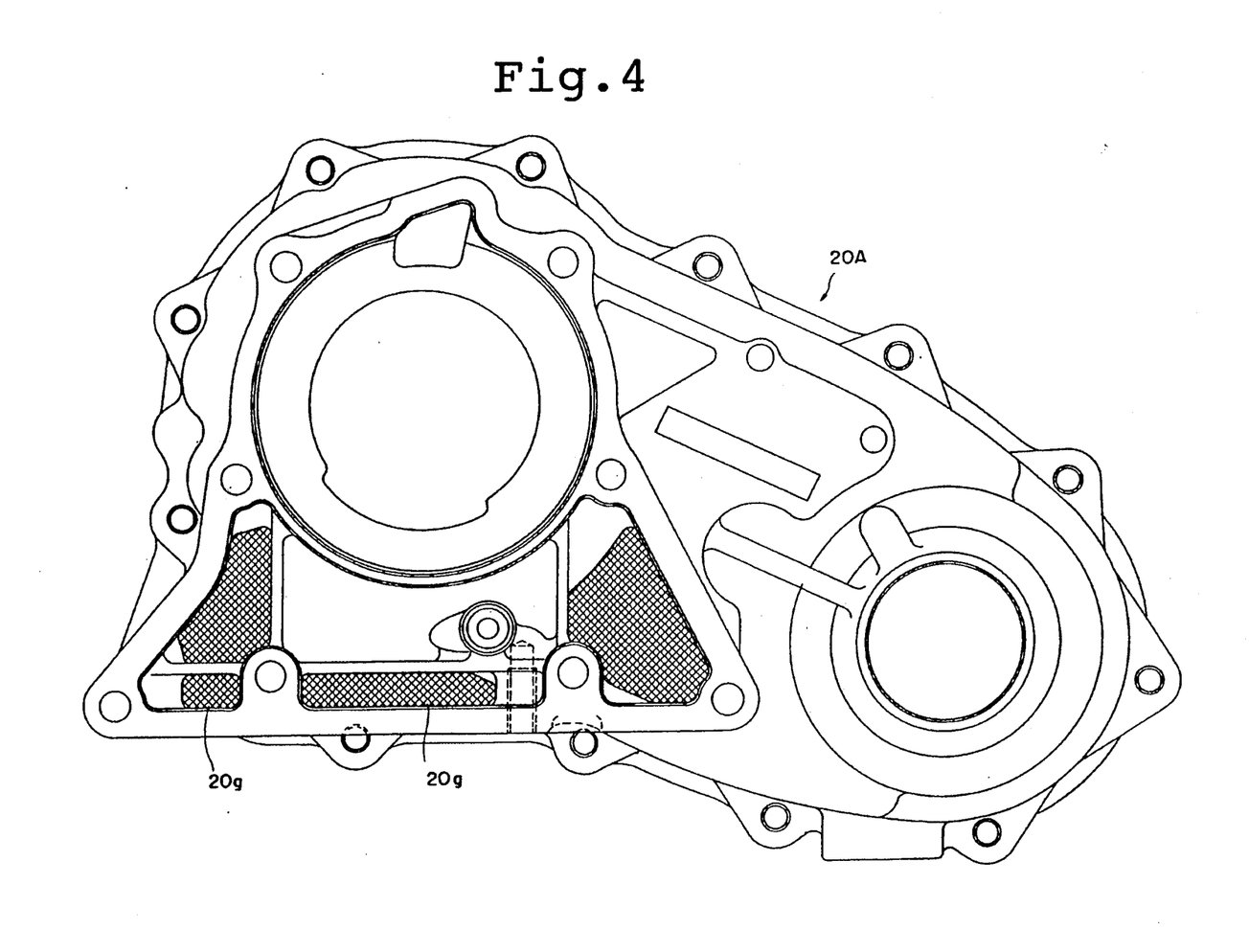
FIG. 4–FIG. 8 are IV—IV—VIII—VIII cross-sectional views of FIG. 3.

First, the total structure of an automatic transmission is explained with reference to FIG. 3.

This automatic transmission has a transmission 1 including the usual gear train, a gear changing transmitting mechanism 2 provided in the rear end of the transmission, for transmitting the torque to the front end thereof, and a transfer mechanism provided in the rear end of the chain transmitting mechanism, for distributing the torque into the rear and front ends. The gear train 11 of the transmission 1 has an overdrive planetary gear unit 12 in front of the gear train with the usual two planetary gear sets establishing three forward speeds and one reverse speed to establish four forward speeds and one reverse speed. These components are housed in the transmission case 10, under which the valve body 13 is located, the oil pan 14 being located under the valve body.

A transfer case 3 has a planetary gear unit 31 and a clutch 34 connecting and disconnecting a carrier 32 and a sun gear 33. The output torque from the transmission 1 is transmitted to the carrier 32, to the front end, that is, to the drive sprocket of the chain transmitting mechanism 2 via sun gear 33, and to the rear end via ring gear 35. The oil fluid pressure for engaging the clutch 34 is derived from the valve body 36 of the transfer case 3. The oil pressure is supplied to the valve body 36 from the valve body 13 of the transmission 1 as a line pressure and is supplied to the clutch cylinder 37 by regulating the line pressure through a linear solenoid valve. The engagement force of the clutch friction members is controlled by the oil fluid pressure and controlled to distribute the torque from 3:7 (front:rear) to the fixed rigid condition between the carrier 32 and the sun gear 33.

The chain case 20 of the chain transmitting mechanism 2 is disposed at the rear end of the transmission 1 and comprises a front chain case 20A and a rear chain case 20B. The transfer case 3 is disposed in the rear end of the chain case 20.

Figure 1:
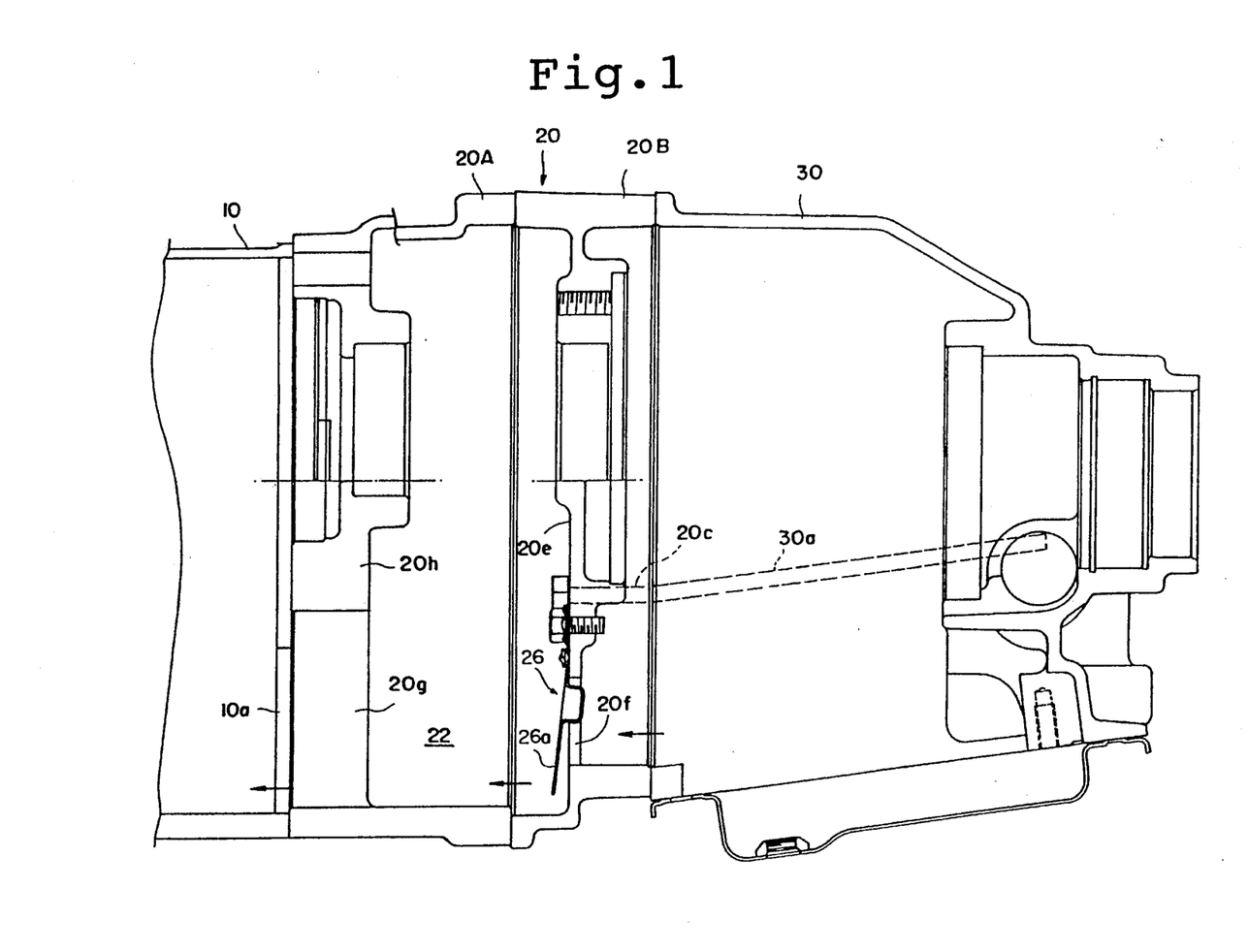
FIG. 1 is a cross-sectional view of one embodiment of an automatic transmission according to the present invention, from the rear transmission case to the transfer case.

FIG. 1 shows a cross-sectional view of the structure from the rear transmission case to the transfer case. In this embodiment, the reverse inhibit means 26 is disposed in the feedback passage including opening 20f in the portion 20e of the rear chain case 20B.

Figure 2A:
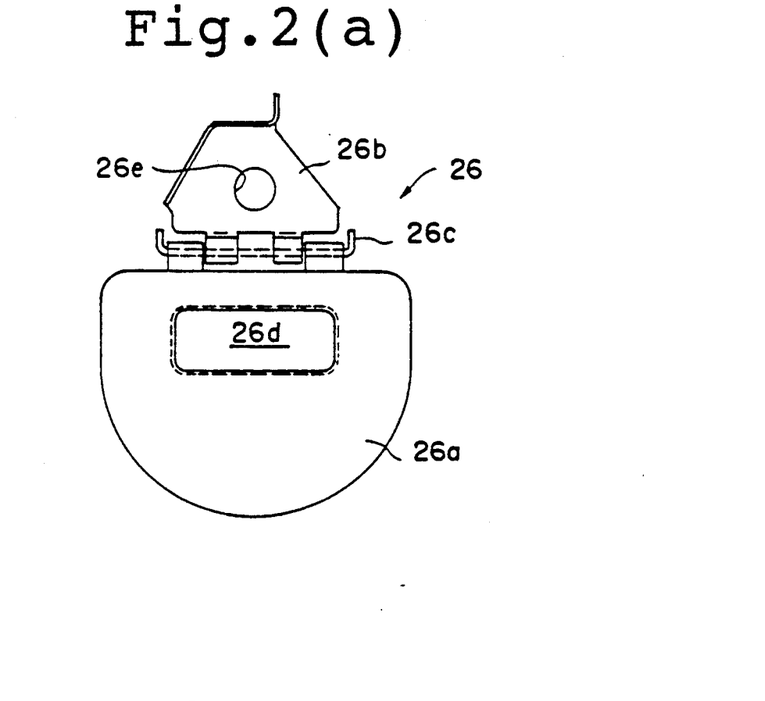
FIG. 2a is a front elevational view of the reverse flow inhibit means.
Figure 2B:
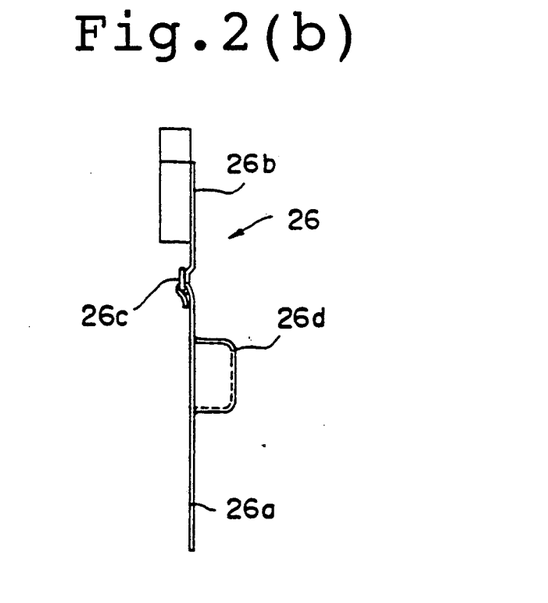
FIG. 2b is a side elevational view of the reverse flow inhibit means.

FIG. 2 shows the structure of the reverse inhibit means, (a) denoting a front view and (b) a side view. The reverse inhibit means 26C, as shown in FIG. 2, is a semi-circular shaped flap type valve 26a pivotally suspended from the board 26b via the horizontal shaft 26c at the upper end thereof.

A rectangular projection 26d, manufactured by press-forming, is found at the rear side (right side of the figure) above the center of the planar surface of the valve 26a. The projection 26d contributes to improving the rigidity of the thin planar type valve 26a and to slightly open the valve 26a by shifting the center of gravity on the valve 26a to the rear side. The bolt hole 26e is provided in the board 26b. As shown in FIG. 1, the reverse inhibit means 26 as above described is connected to the front surface of the partition 20e by a bolt engaging in the bolt hole 26e. When connected, the valve 26a is open toward the front side as shown in the above description. FIG. 4–FIG. 8 are the cross-sectional views IV—IV—VII—VII of FIG. 3. In the automatic transmission, the oil fluid supplied from the transmission 1 to the transfer case 3 is supplied to the valve body 36 disposed to the side of the transfer case 3 from the valve body 13 disposed to the side of the transmission 1, and supplied to each portion of the transfer mechanism by regulating it through the regulator valve (not shown in the figure) provided in the valve body 36. And the oil, which operates the transfer mechanism and lubricates, is returned to the transmission 1 directly or after lubricating the chain transmitting mechanism 2. That is, the feedback passage of the transfer case 3, as shown in FIG. 1 and FIG. 8, has the oil receipt gutter 30a inclined to the front side and the bottom of the transfer case 30 around the outer circumference at one side (refer to FIG. 3) of the planetary gear unit 31 and the clutch 34 from the rear end of the transfer case 30 to the front end thereof. The bottom of the transfer case 30 is connected to the rear chain case 20B at the same level.

Figure 5:
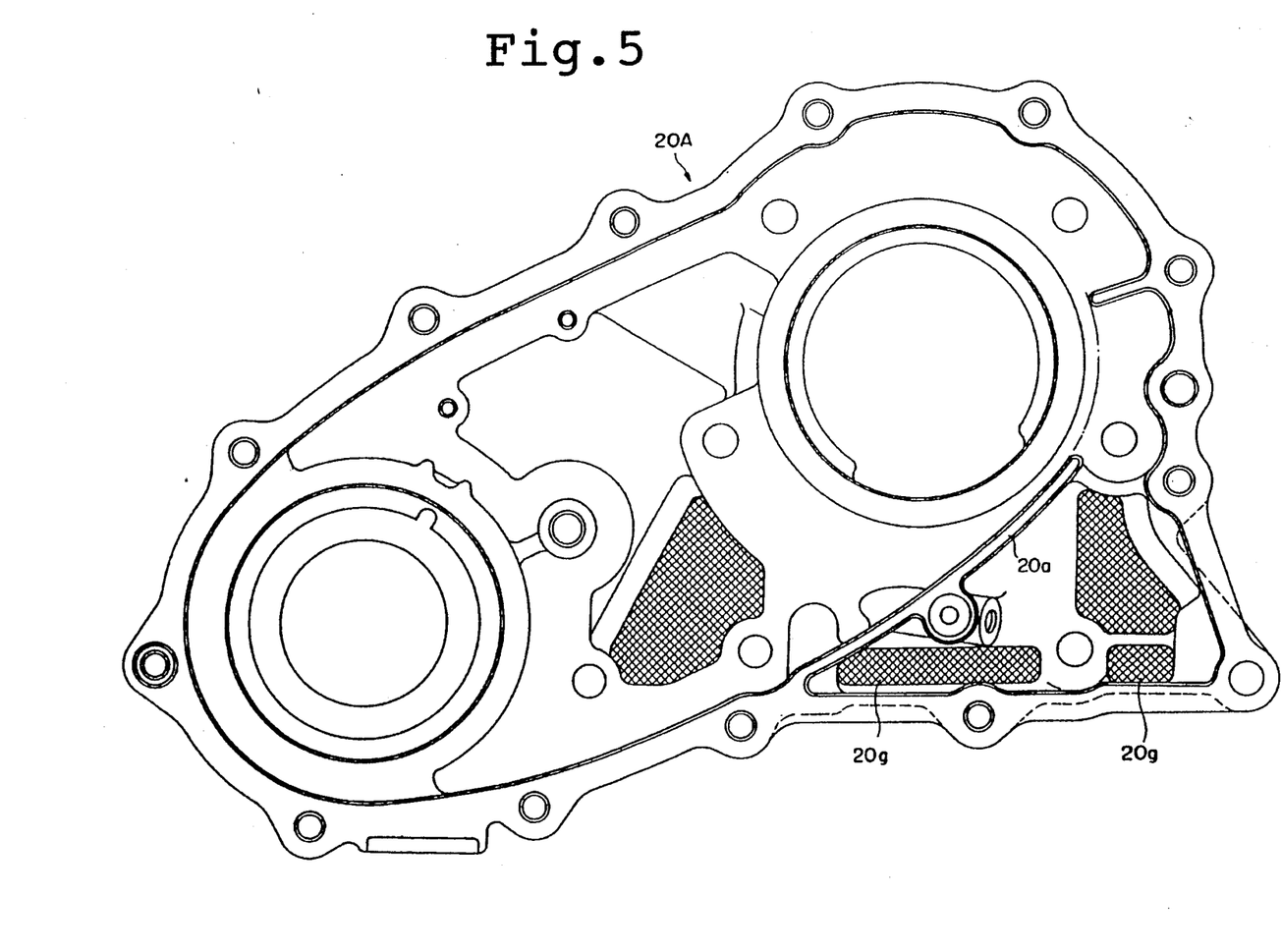
Figure 6:
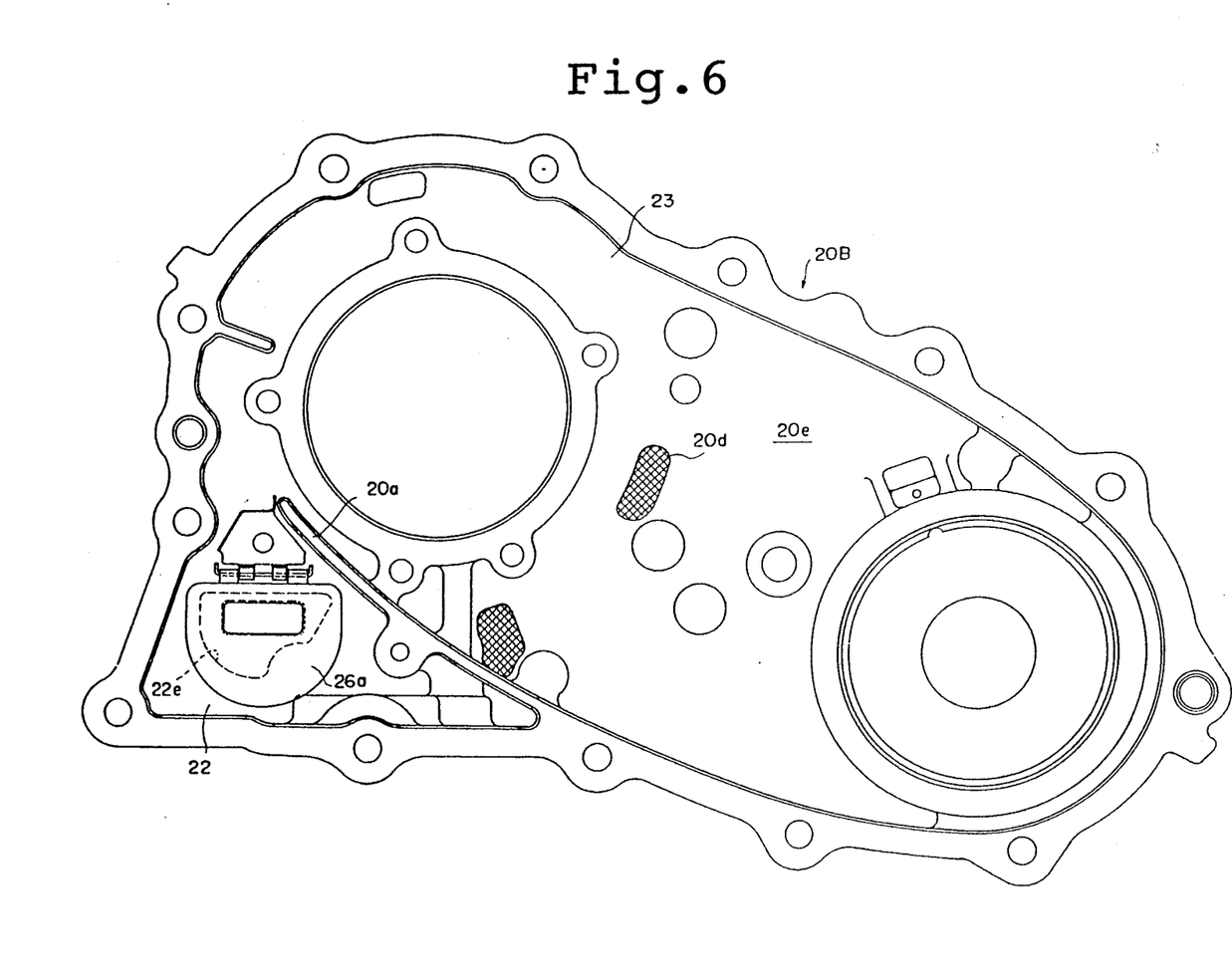
Figure 7:
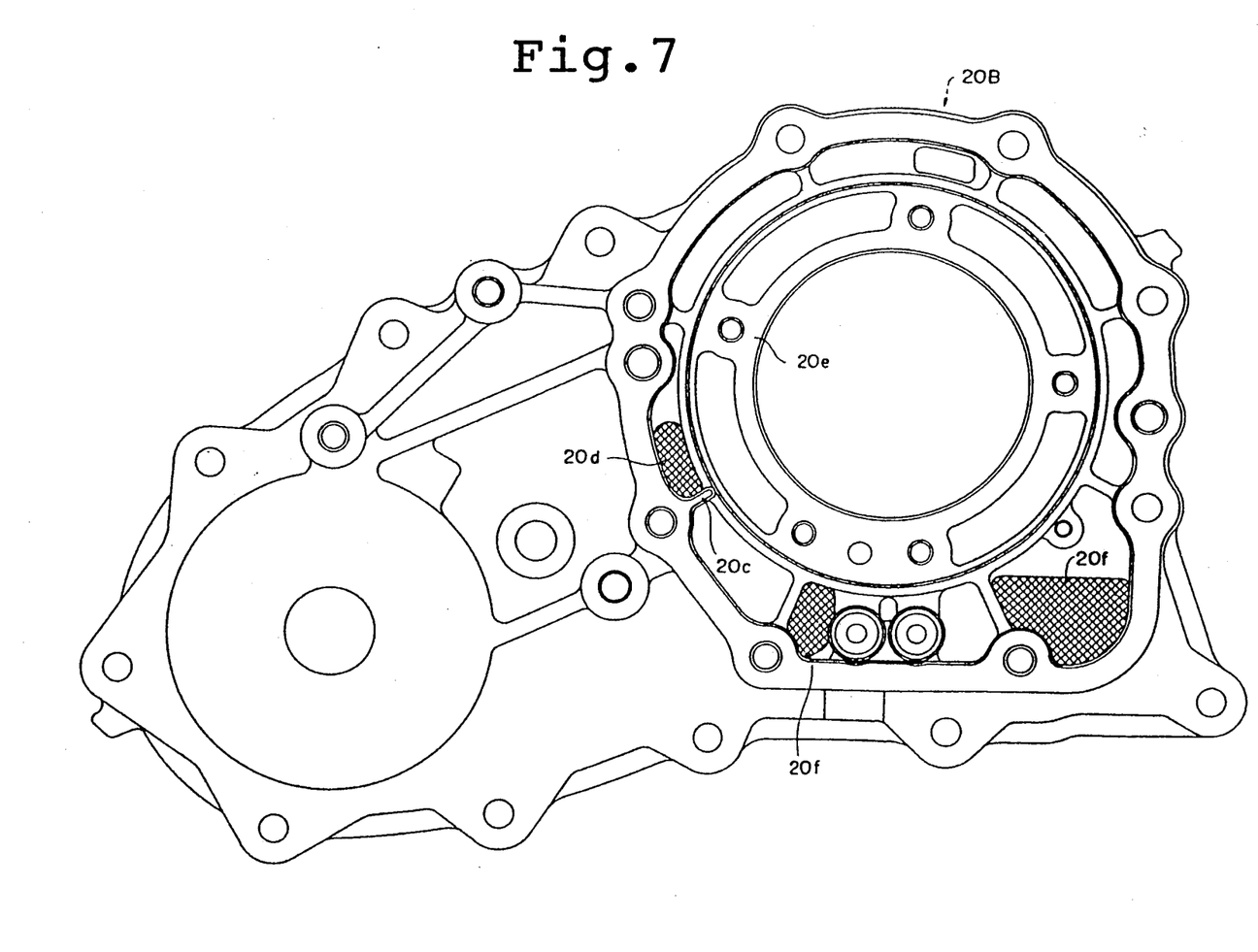
Figure 8:
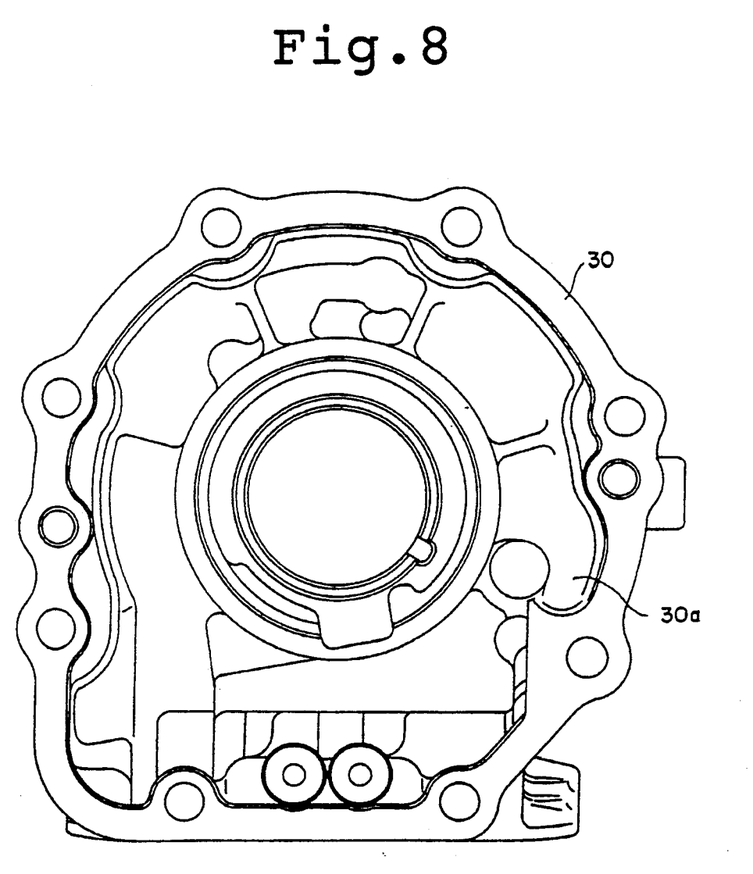

In the rear chain case 20B, as shown in FIG. 1 and FIG. 7, the rib 20c is connected to the oil receipt gutter 30a and the oil return passage formed in the upper side of the rib 20c is connected to the chain compartment 23 via the opening 20d. The oil return passage of the bottom is connected to the feedback compartment 22 via the opening 20f of the partition 20e and to the case from the opening 10a of the transmission case 10 via the opening 20g of the partition 20h in the front chain case 20A. The feedback passage for returning the oil of the transmission 1 as shown in FIG. 3 after supplying the oil to the chain transmitting mechanism via the transfer mechanism, has the feedback compartment 22 at the front of the chain case 20A. Though the feedback compartment 22 is disposed in the chain case 20, it is connected directly to the transmission case 10 without communicating with the chain compartment 23. That is, as shown in FIG. 5 and FIG. 6, the feedback compartment 22 is isolated from the chain compartment 23 by the rib 20a inclined from the case bottom.

In this embodiment of the automatic transmission, the oil returned from the transfer case 30 flows to the feedback compartment 22 via the opening 20f of the partition 20e during driving vehicle. But the flow in the feedback direction flows easily through the gap between the valve 26a and partition 20e which is normally open by shifting the center of gravity to the rear side, and the opening 20f by making use of the steps between the front and rear side of the partition 20e. Accordingly, the feedback oil is smoothly returned to the feedback passage without receiving any resistance required for releasing the valve 26a.

Under the circumstance when the vehicle is started suddenly and accelerated rapidly and the reverse oil flow is caused by the vehicle inclination, inertia power and so on, the oil would flow to the rear end beyond the step between front and rear side of the portion. But, at that time, as the valve 26a is rotated counterclockwise as shown in figure by its inertia and the reverse oil pressure, and closes the opening 20f of the partition 20e from the front side, reverse oil flow is positively prevented.

According to the above-described embodiment, the automatic transmission can always keep the proper oil level during rapid starts and rapid acceleration the same as in normal constant speed driving by preventing oil from collecting in the rear portion of a four-wheel drive automatic transmission. Though only one embodiment relating to the present invention was explained, it goes without saying that various other embodiments, which include several components different from those of the above embodiment, can be provided within the scope of the claims.

We claim:
1. An automatic transmission for a vehicle comprising:
   an elongated casing having a longitudinal axis parallel to the length of the vehicle and divided into front and rear compartments by an internal wall generally perpendicular to said axis, each of said front and rear compartments having a sump for collecting oil;
   a passage provided through said internal wall, said passage providing fluid communication for said collected oil between the sump of said front compartment and the sump of said rear compartment;
   reverse flow inhibit means for allowing oil to flow from the sump of said rear compartment to the sump of said front compartment while inhibiting the oil from flowing in the reverse direction, said reverse flow inhibit means including a flap valve pivotally suspended from said internal wall, within said front compartment at a position covering said passage, said flap valve having a center of gravity located so that said flap valve is normally open with a gap between said flap valve and said internal wall, said flap valve pivoting against said internal wall and thereby closing said passage responsive to sudden starting or acceleration of the vehicle.

2. An automatic transmission according to claim 1, wherein said flap valve has a projection for establishing said center of gravity.

3. An automatic transmission for a four-wheel drive vehicle in accordance with claim 1 and further comprising:
   an output shaft;
   a transfer unit for distributing output torque to front and rear wheels, said transfer unit having a planetary gear unit mounted in said rear compartment, said planetary gear unit including a carrier connected to said output shaft, a ring gear for transmitting torque from said carrier to said rear wheels and a sun gear for transmitting torque from said carrier to said front wheels; and a clutch provided between said sun gear and said carrier.

4. An automatic transmission according to claim 3, further comprising:

a valve body for producing a regulated line pressure for control of said clutch.

5. An automatic transmission according to claim 3, further comprising:

a transmission and a chain transmitting mechanism mounted within said front compartment and connecting said sun gear and said front wheels.

6. An automatic transmission according to claim 5 wherein said chain transmitting mechanism has front and rear cases supporting a drive sprocket, and wherein said passage and said reverse flow inhibit means are located in said rear case.

7. An automatic transmission according to claim 1, wherein said flap valve comprises a planar portion and a projection extending from said planar portion toward said rear compartment.

8. An automatic transmission according to claim 1, wherein said flap valve is a plate member having an arched portion arched toward said rear compartment and a planar portion integral with and surrounding said arched portion, said arched portion being received in said passage.

* * * * *